(12) United States Patent
Dimitris et al.

(10) Patent No.: US 8,151,472 B2
(45) Date of Patent: Apr. 10, 2012

(54) RAZOR HANDLE AND SHAVER INCLUDING SUCH A HANDLE

(75) Inventors: Efthimiadis Dimitris, Athens (GR); Bozikis Ioannis, Athens (GR)

(73) Assignee: BIC-Violex SA, Anixi, Attiki (GR)

( * ) Notice: Subject to any disclaimer, the term of this patent is extended or adjusted under 35 U.S.C. 154(b) by 0 days.

(21) Appl. No.: 12/501,174

(22) Filed: Jul. 10, 2009

(65) Prior Publication Data

US 2009/0271995 A1 Nov. 5, 2009

Related U.S. Application Data

(62) Division of application No. 11/574,873, filed as application No. PCT/FR2004/010774 on Sep. 7, 2004, now Pat. No. 7,685,720.

(51) Int. Cl.
*B26B 21/52* (2006.01)

(52) U.S. Cl. .......................................... 30/527; 30/532

(58) Field of Classification Search .............. 30/50, 527, 30/531, 532, 533
See application file for complete search history.

(56) References Cited

U.S. PATENT DOCUMENTS

| | | | | |
|---|---|---|---|---|
| 3,950,849 | A * | 4/1976 | Perry | ................................ 30/47 |
| 4,026,016 | A | 5/1977 | Nissen | |
| 4,266,340 | A | 5/1981 | Bowman | |
| 4,488,357 | A | 12/1984 | Jacobson | |
| 4,492,025 | A | 1/1985 | Jacobson | |
| 4,573,266 | A * | 3/1986 | Jacobson | ........................ 30/41 |
| 4,587,729 | A | 5/1986 | Jacobson | |
| 4,756,082 | A * | 7/1988 | Apprille, Jr. | ................... 30/530 |
| 5,016,352 | A | 5/1991 | Metcalf et al. | |
| 5,157,834 | A | 10/1992 | Chen et al. | |
| 5,299,354 | A | 4/1994 | Metcalf et al. | |
| 5,347,717 | A * | 9/1994 | Ts'ai | ............................... 30/532 |
| 6,112,412 | A * | 9/2000 | Richard | ........................ 30/41.5 |
| 6,115,924 | A * | 9/2000 | Oldroyd | ........................ 30/527 |
| 6,434,839 | B1 | 8/2002 | Lee et al. | |
| 7,152,512 | B1* | 12/2006 | Prochaska | ........................ 83/13 |
| 7,526,869 | B2* | 5/2009 | Blatter et al. | ................... 30/532 |
| 7,685,720 | B2* | 3/2010 | Efthimiadis et al. | ............ 30/527 |

FOREIGN PATENT DOCUMENTS

| | | |
|---|---|---|
| CN | 1359323 A | 7/2002 |
| EP | 0 271 185 | 6/1988 |
| EP | 0 271 860 | 6/1988 |
| EP | 0 402 105 | 12/1990 |
| FR | 2 310 843 | 5/1976 |
| WO | WO 00/16951 | 3/2000 |

OTHER PUBLICATIONS

Chinese Office Action dated Jun. 12, 2008.

* cited by examiner

*Primary Examiner* — Hwei C Payer
(74) *Attorney, Agent, or Firm* — Jones Day

(57) ABSTRACT

A razor handle having a handle body including two arms, each having a bearing for pivotally connecting a shaving head about an axis of rotation, the arms extending substantially symmetrically on both sides of a medial axis, each bearing having a protrusion extending toward the axis of rotation so as to limit the angular range of rotation of the shaving head.

4 Claims, 10 Drawing Sheets

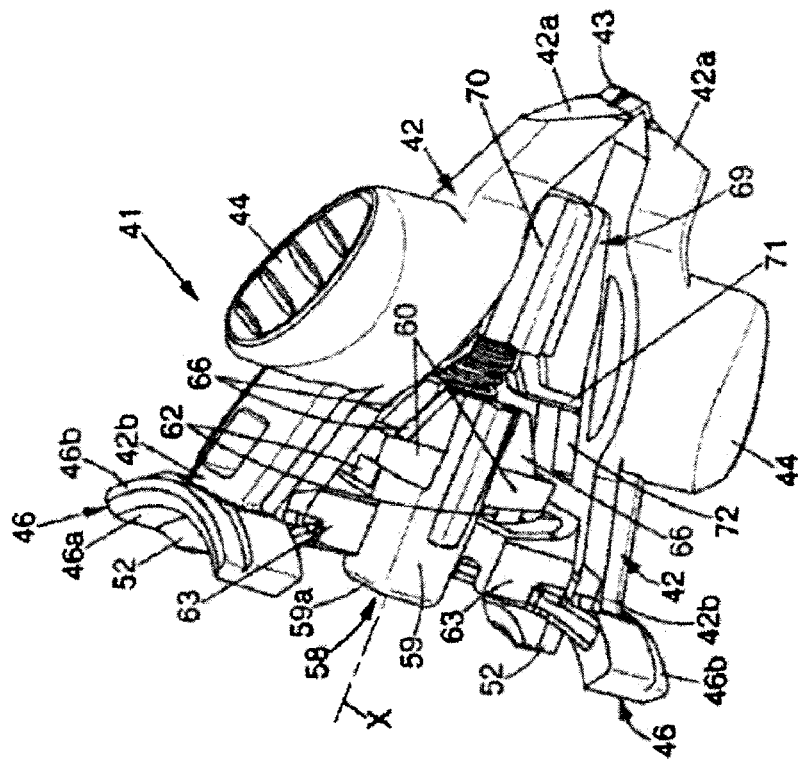
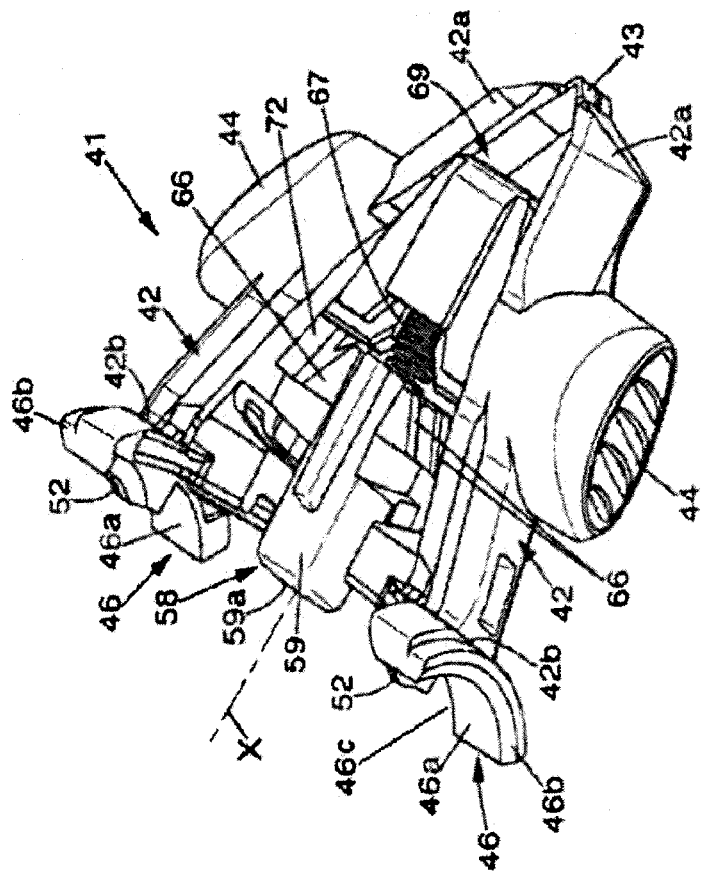

RAZOR HANDLE AND SHAVER INCLUDING SUCH A HANDLE

CROSS REFERENCE TO RELATED APPLICATIONS

This application is a divisional of U.S. application Ser. No. 11/574,873, filed on Apr. 28, 2007, now U.S. Pat. No. 7,685,720, which is the National Stage application of International Application No. PCT/FR04/10774, filed on Sep. 7, 2004. The entire contents of all applications are incorporated herein by reference.

FIELD OF THE INVENTION

The embodiments of the present invention relate to a razor handle and to shavers including such handles.

BACKGROUND OF THE INVENTION

More precisely, the embodiments of the present invention relate to a razor handle having a handle including:

two arms, each having a bearing for pivotally connecting a shaving head about an axis of rotation, the arms extending substantially symmetrically on both sides of a medial axis, each bearing having a protrusion extending toward the axis of rotation so as to limit the angular range of rotation of the shaving head.

U.S. Pat. No. 4,888,357 discloses an example of such a known shaver, in which the arms are connected together by a resilient bridge portion which biases the arms in opposite directions. The biasing force transmitted to the arms by the bridge portion may, however, vary in time due to the creeping or wear of the plastic material forming the bridge portion.

OBJECTS AND SUMMARY OF THE INVENTION

One objective of an embodiment of the present invention is to avoid this drawback.

To this end, according to the invention, in a vibrating shaver of the type in question, the lock/release mechanism further includes an arm pusher which is movable substantially parallel to the medial axis and which is biased toward the handle body by the spring, the arm pusher cooperating with the two arms by camming action for biasing the arms toward the head locking position.

Thanks to these dispositions, it is possible to obtain a reliable biasing effort on the arms, without having multiple springs.

In various embodiments of the present invention, one may possibly have recourse in addition to one and/or other of the following arrangements:

the two arms are connected to one another by a hinge;
the arms are molded as a single piece, the hinge comprising a thin bridge of material connecting the two arms to each other;
each arm extends between a first end connected to the hinge and a second end including one of the bearings;
the bearings are shell bearings;
the arms are partially contained inside the handle body and the bearings are exposed toward the outside;
each arm includes a pushbutton which is adapted to protrude outside the body when the arms are in the locking position;
the two arms diverge from the medial axis in a direction away from the handle body;

the spring is a compression spring interposed between the plunger and the arm pusher in the medial direction;
the spring extends between two spring ends, penetrating respectively in a recess belonging to the plunger and in a recess belonging to the arm pusher;
the plunger has a central body and two lateral wings, the central body being adapted to cooperate with the cam surface of the shaving head to bias the shaving head toward the rest position, and the central body including the recess of the plunger which opens toward the arm pusher;
the plunger has a central body and two lateral wings, the two lateral wings of the plunger being adapted to cooperate by hooking action respectively with the two arms to maintain the arms in the head release position when the plunger is in an outwardly protruding position; the lateral wings of the plunger are adapted to release the arms when the plunger is moved toward the handle body relative to the outwardly protruding position;
the lateral wings of the plunger include detents which protrude away from the handle body, substantially parallel to the medial axis, and the arms include two openings adapted to receive the detents to maintain the arms in the head release position when the plunger is in an outwardly protruding position;
the arm pusher has a central body and two lateral extensions cooperating by camming action respectively with the two arms for elastically biasing the arms toward the head locking position;
the two lateral extensions penetrate in two slots formed respectively in the two arms;
each slot has a bottom and each lateral extension cooperate by camming action with the bottom of the corresponding slot;
the two extensions of the arm pusher have lateral edges which diverge from the medial axis in a direction away from the handle body, the lateral edges bearing respectively on the bottoms of the slots, and the bottoms also diverging from the medial axis in a direction away from the handle body.

Besides, another object of an embodiment of the present invention is a shaver including a razor handle as defined above and a shaving head pivotally attached to the handle by the bearings, the shaving head including a cam surface and the plunger being elastically biased against the cam surface for biasing the shaving head toward a rest position. The bearings may be shell bearings and the shaving head may further include two inwardly facing arcuate slots receiving respectively the two bearings of the arms.

BRIEF DESCRIPTION OF THE DRAWINGS

Other features and advantages of the embodiments of the present invention appear from the following detailed description of one of its embodiments, given by way of non-limiting example, and with reference to the accompanying drawings.

In the drawings:

In the figures, the same references denote identical or similar elements.

FIGS. 1a and 1b show a wet shaver 1, i.e. a shaver the blades of which are not driven by a motor relative to the shaving head.

Figure 1A:
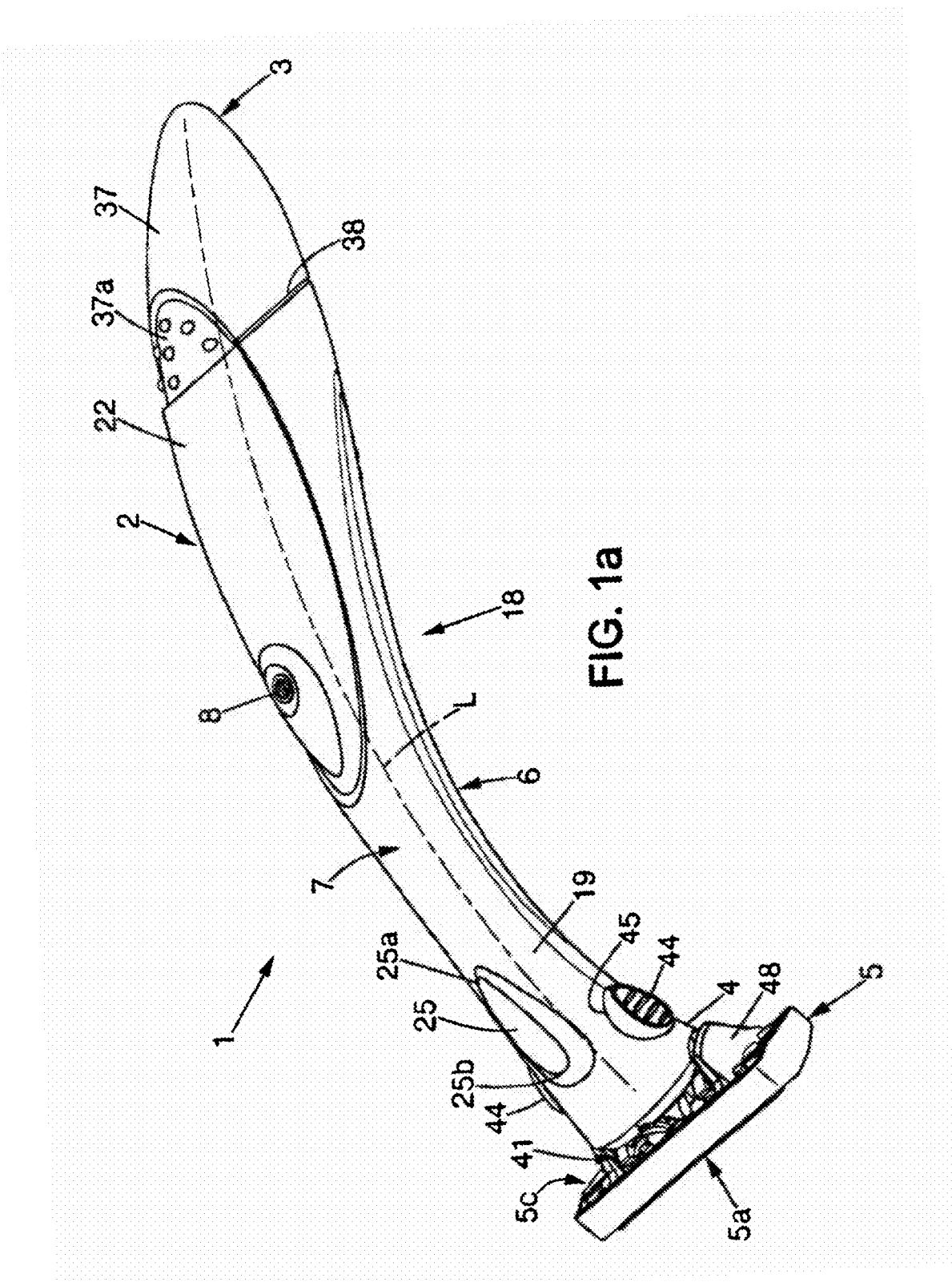
FIGS. 1a and 1b are respectively perspective views of a shaver according to one embodiment of the invention, seen from above and from below.

The shaver 1 includes a hollow handle 2 extending in a longitudinal direction L between a proximal portion 3 and a distal portion 4 bearing a shaving head 5. The shaving head 5 includes a front face 5a equipped with one or several blades 5b and a rear face 5c which is connected to the handle 2.

The longitudinal direction L may be curved or include one or several straight portions. In the present case, the longitudinal direction L is curved, with a concavity which is constantly directed toward the underside 6 of the handle (i.e. the side of the handle which faces substantially the same direction as the front face 5a of the shaving head).

The shaver may further include, for instance on the top side 7 of the handle (i.e. the side of the handle which faces opposite the front face 5a of the shaving head), a flexible wall 8 which enables to actuate a switch 9 (see FIGS. 2 and 3) mounted inside the hollow handle 2, for instance by pressing on a pusher 10 of the switch when depressing the flexible wall 8.

The switch 9 controls an electric vibrator 11 (see FIGS. 2-4) which is able to generate vibrations and transmits them to the handle 2. The electric vibrator may include for instance:
an electric motor 12 having a rigid outer casing 13,
an output shaft 14 rotated by the electric motor 12,
and an eccentric mass 15 which is mounted on the output shaft 14.

As it will be explained in further details hereafter, the rigid outer casing 13 of the electric motor 12 is tightly fitted in the handle 2, in the vicinity of the distal portion 4, with interposition of an elastomeric layer 16 between the casing and the handle.

The casing 13 may be circular in cross section, and may in particular have substantially the shape of a circular cylinder and the elastomeric layer 16 may surround the casing 13 of the vibrator. The elastomeric layer may be in the form of an elastomeric sleeve surrounding the casing of the vibrator or more generally may include such elastomeric sleeve.

Figure 5:
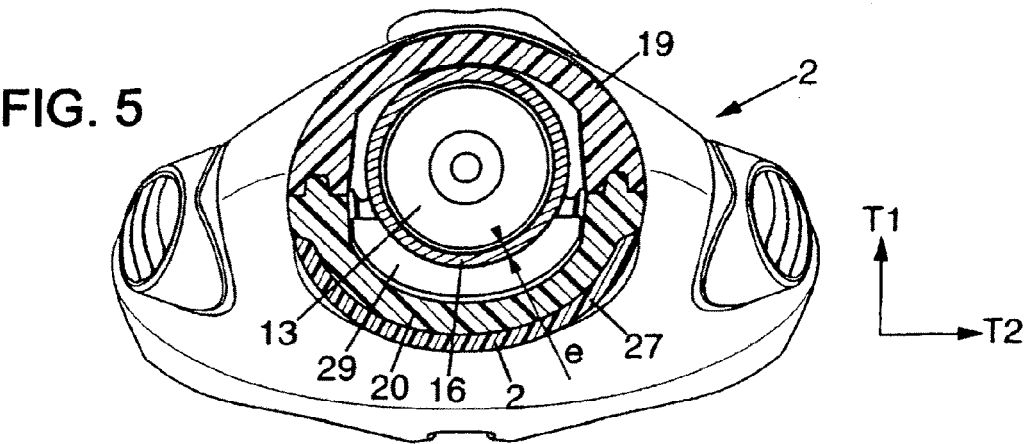
Figure 6:
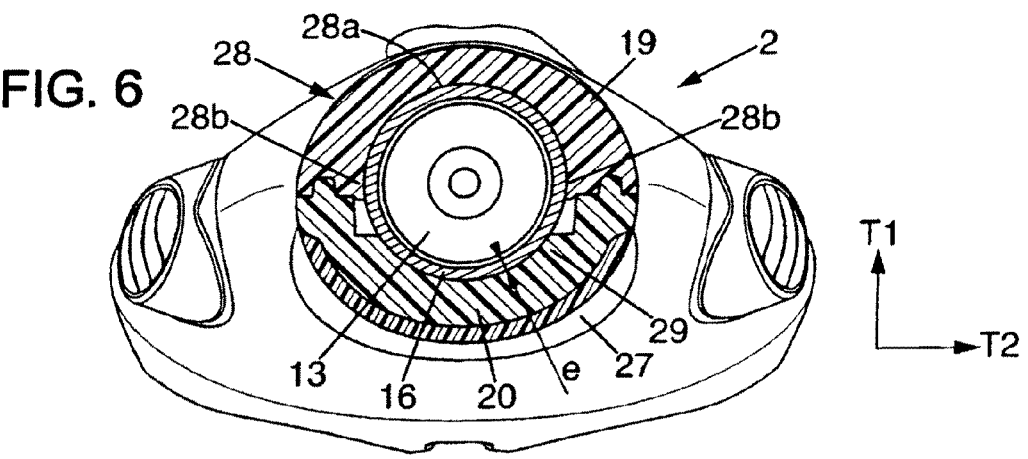
Figure 7:
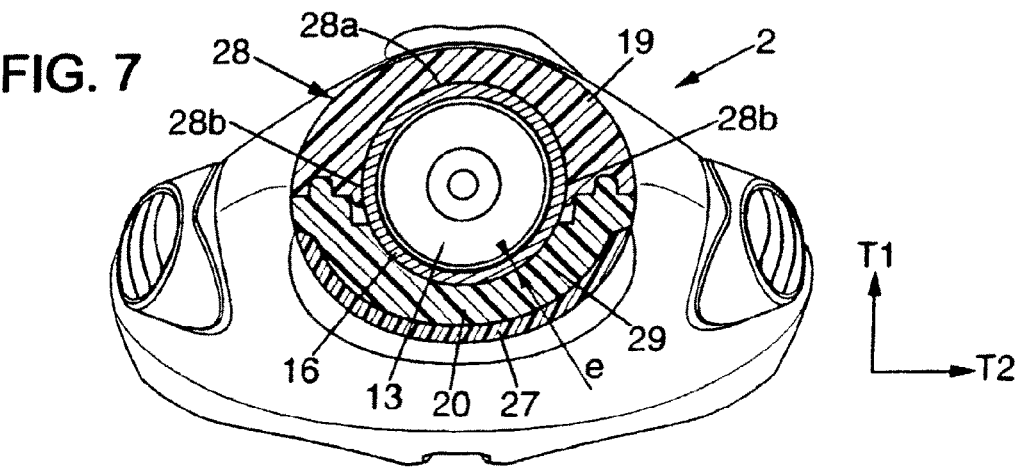

As shown in FIGS. 5-7, the thickness "e" of the elastomeric layer may be comprised for instance between about 0.2 and about 1 mm. More particularly, where the elastomeric layer 16 is compressed between the casing 13 and the handle 2, the thickness "e" may be comprised between about 0.2 and about 0.6 mm, and for instance be around 0.4 mm, whereas in the portions where the elastomeric layer is not compressed between the casing and the vibrator, the thickness "e" of such layer may be comprised for instance between about 0.4 and about 1 mm.

The elastomeric layer 16 may for instance be a silicone layer or more generally may comprise such silicone layer, and the elastomeric layer may have a Shore hardness comprised for instance between about 70 Shore A and about 90 Shore A. The Shore hardness may be for instance around 75 Shore A.

Figure 2:
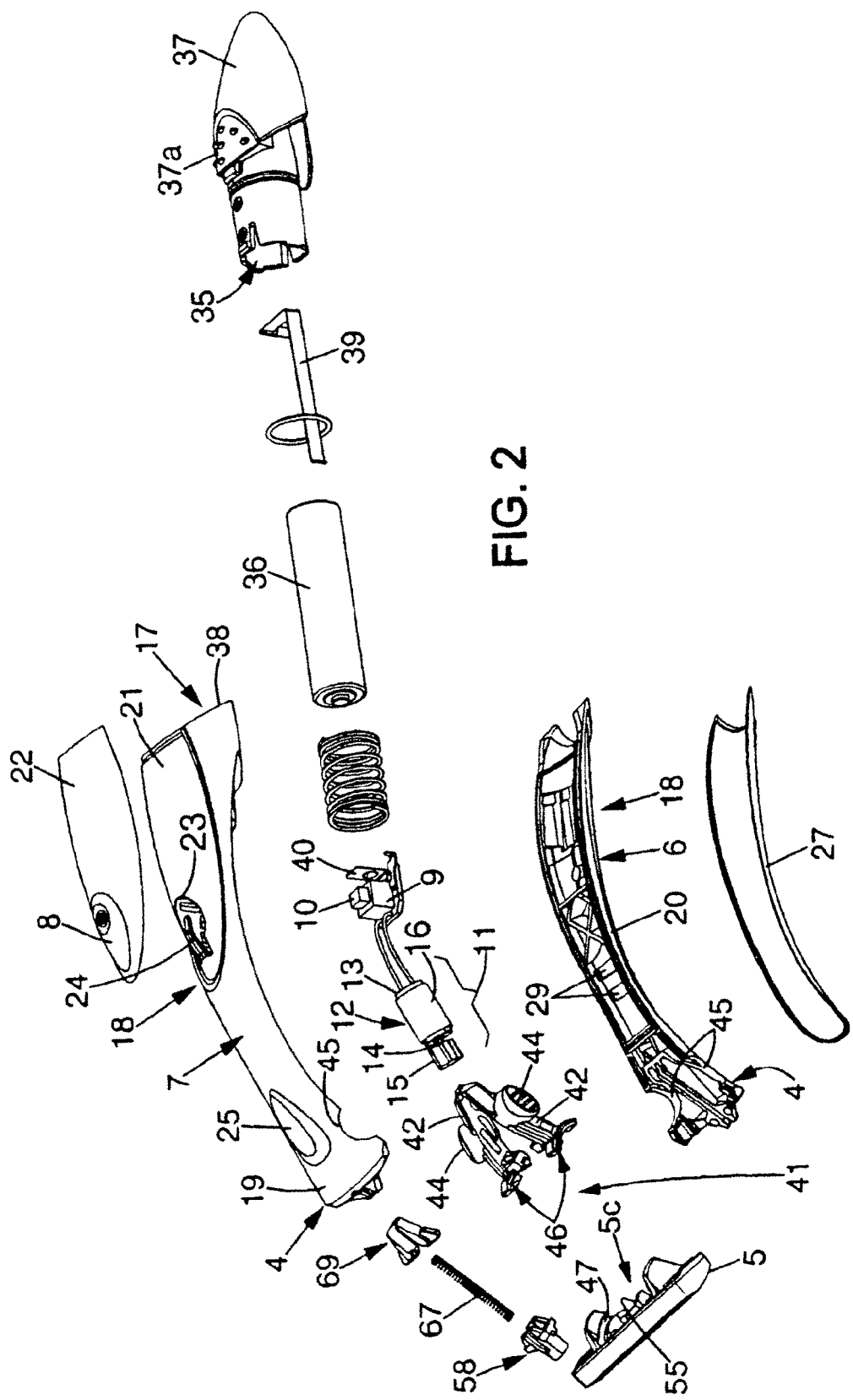
FIG. 2 is an exploded perspective of the shaver of FIGS. 1a and 1b, seen from above.
Figure 3:
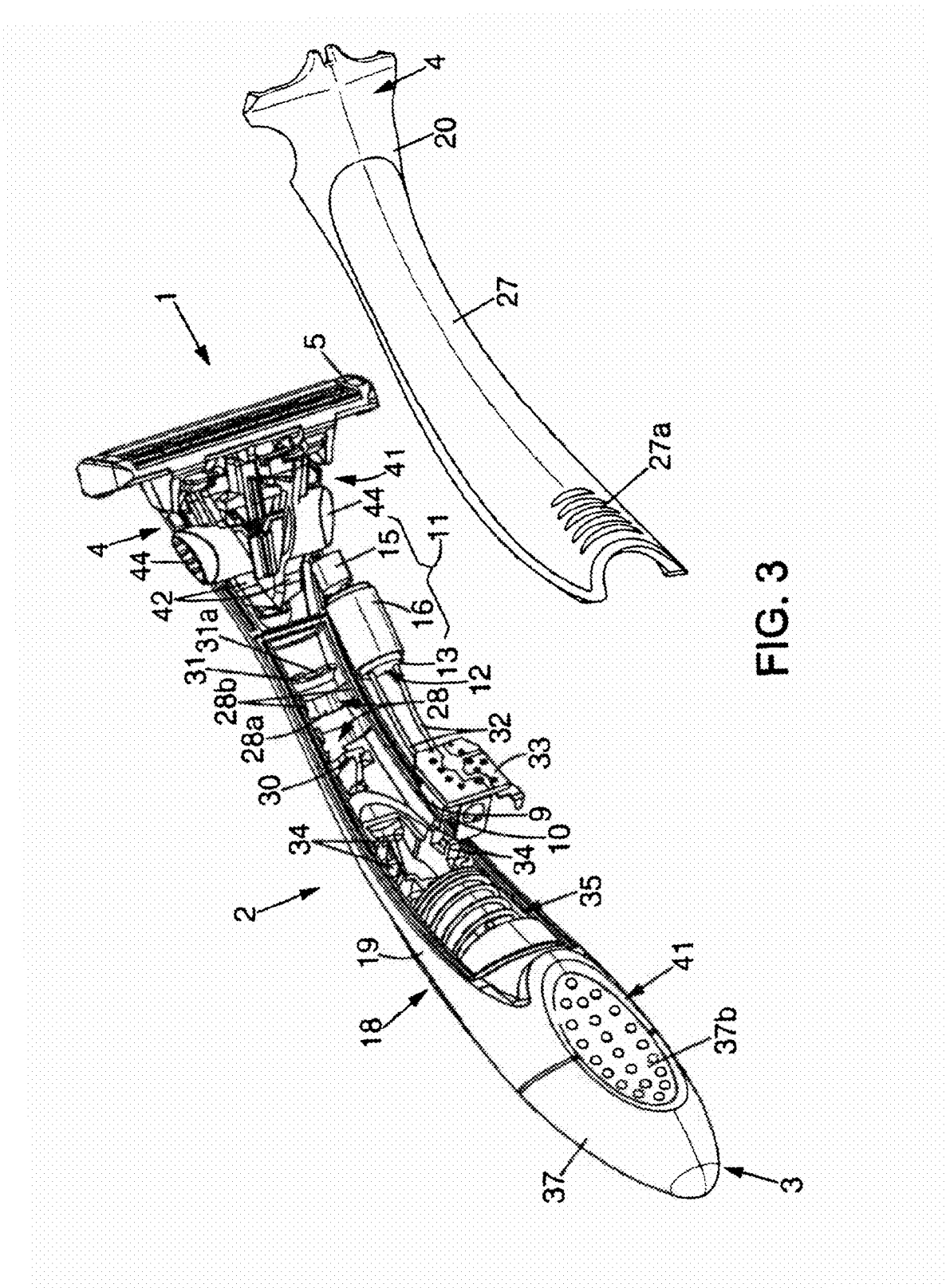
FIG. 3 is an exploded perspective view of the shaver of FIGS. 1a and 1b, seen from below.

In the example considered here, as shown for instance in FIGS. 2 and 3, the handle may include a substantially rigid hollow body 17 (as opposed to softer elastomeric parts of the handle), made out for instance of plastic material, e.g. of molded thermoplastic.

The body 17 may form the distal portion 4 of the handle and the medial portion 18 of the handle, and the body 17 may comprise:
a first body portion 19 forming for instance part of the top side 7 of the handle,
and a second body portion 20 which may form for instance part of the underside 6 of the handle.

The first body portion 19 may include a recessed portion 21 on which is fixed an elastomeric trim 22 which includes the flexible wall 8 in correspondence with a hollow portion 23 which is hollowed out in the recessed portion 21 in correspondence with the pusher 10 of the switch 9.

The first body portion 19 may also include a flexible tongue 24 protruding substantially parallel to the longitudinal direction L in the hollow portion 23 and interposed between the flexible wall 8 and the pusher 10. The flexible tongue 24 is elastically flexed and presses on the pusher 10 when a user depresses the flexible wall 8, and the flexible tongue 24 thereafter elastically returns the flexible wall 8 toward its normal position. In this normal position, the flexible wall 8 may for instance slightly protrude upwardly from the elastomeric trim 22.

Besides, the first body portion 19 may also include, in the example shown in the drawings, an index pad on which the index finger of the user of the shaver may rest (see FIG. 2). This index pad may for instance extend with an increasing width, between a rear tip a and a front end which is wider than the rear tip and which is closer to the shaving head 5 (see FIG. 1a). The index pad may be made for instance out of elastomer.

Besides, as shown for instance on FIGS. 2 and 3, the second body portion 20 may also include an outer recess portion 26 in which is fixed a further elastomeric trim 27. The trim 27 may include for instance transverse ribs 27a at the end of the trim which is opposite the distal portion 4 of the handle.

The elastomeric trims 22, 27 may be fixed to the corresponding body portions 19, by any suitable means, for instance by co-injection.

Figure 4:
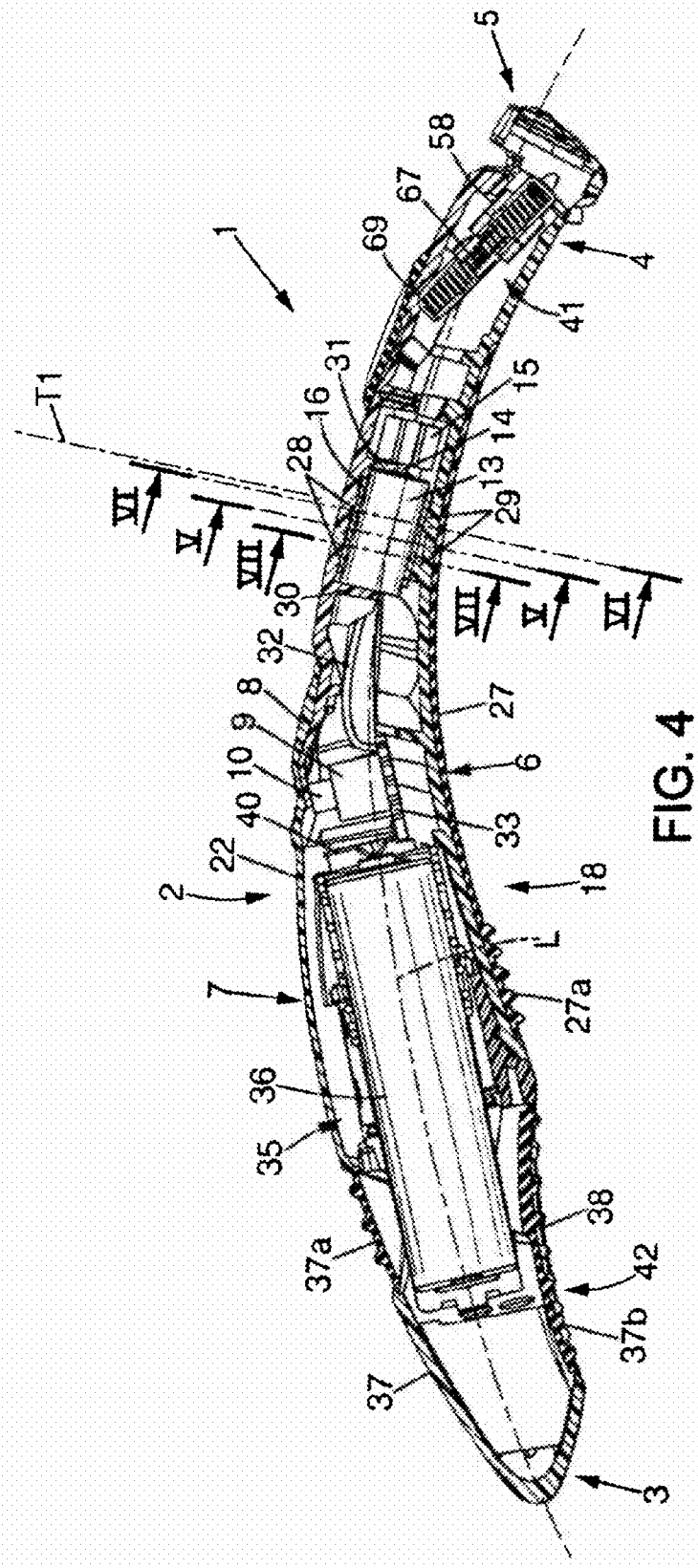
FIG. 4 is a longitudinal cross section of the shaver of FIG. 1, FIGS. 5-7 are respectively transverse cross sections along lines V-V, VI-VI and VII-VII of FIG. 4, FIGS. 8a and 8b are two perspective views, seen in two different directions, of the lock/release mechanism connecting the razor handle to the shaving head in the shaver of FIGS. 1a and 1b.

The first and second body portions 19 are facing each other in a first transverse direction T1 (FIG. 4) which is substantially perpendicular to the longitudinal direction L at the level of the motor 12 and which is comprised in a medial plane of symmetry of the shaver 1. More precisely, the first transverse direction, as shown in FIG. 4, is perpendicular to the output shaft 14 of the motor.

The first and second body portions 19, 20 may be fixed together by fitting and by ultrasonic welding. However, the first and second body portions could be fixed together by any other means, such as snap fitting, gluing, etc.

The casing 13 of the motor may be for instance tightly fitted between:
at least one, for instance two concave bearing surfaces 28 belonging to the first body portion 19 and 20 facing toward the second body portion 20 parallel to the first transverse direction T1 (see FIGS. 3 and 6), and at least one, for instance two second concave bearing surfaces 29 belonging to the second body portion 20 and facing toward the first body portion 19 in the first transverse direction T1 (FIGS. 2 and 7).

These first and second bearing surfaces, which may be either in mutual correspondence on both sides of the motor 12 or axially offset along the longitudinal direction L of the motor 12, are more clearly visible on FIGS. 6 and 7.

As shown on FIG. 6, the or each first bearing surface 28 may have a substantially U shape, with a base surface 28a and two substantially parallel side surfaces 28b facing each other in a second transverse direction T2 substantially perpendicular to the first transverse direction and to the longitudinal direction. These side surfaces 28b may be disposed to be clamped onto substantially diametrically opposed portions of the casing 13, with interposition of the elastomeric layer 16. This feature enables an easier manufacturing process, since the motor 12 may thus be retained in the first bearing surface 28 after being mounted therein, before mounting of the second body portion 20 onto the first body portion 19.

Besides, in the embodiment shown in the drawings, the elastomeric layer 16 may be more compressed in the second transverse direction T2 between the two side surfaces 28b of the first bearing surface 28 (FIG. 6), than in the first transverse direction T1 between the second bearing surface 29 and the base surface 28a of the first bearing surface.

This feature may also facilitate the manufacturing process, particularly since the tolerances of mutual positioning between the second bearing surface 29 and the base surface 28a parallel to the first transverse direction T1 may be larger than the tolerances between the side surfaces 28b parallel to the second transverse direction T2. As shown in FIGS. 3 and 4, the casing 13 of the motor is also axially fitted between two abutments, parallel to the longitudinal direction L, to with a rear abutment 30 belonging for instance to the first body portion and a front abutment 31 which may also belong to the first body portion.

The front abutment 31 which may include a cut out 31a for the output shaft 14 of the motor, the front abutment being axially interposed between the casing 13 and the eccentric mass 15, preferably without contact between front abutment 31 and the eccentric mass 15.

As shown in FIG. 3, the switch 9 is mounted between the vibrator 11 and the proximal portion 3 of the handle, close to the vibrator 3, and is connected to the motor 12 by electric wires 32. The switch 9 may be fixed to a base plate 33 such as an electronic circuit board, which is itself fitted in support members 34 belonging for instance to the first body portion 19.

Besides, the handle further includes a battery housing (see FIGS. 3 and 4) which is situated between the switch 9 and the proximal portion 3. This battery housing is adapted to receive a battery 36 extending longitudinally substantially parallel to the longitudinal direction L of the handle. This battery may be inserted in and removed from the battery housing parallel to the longitudinal direction L, after removing an end cap 37 which forms the proximal portion 3 of the handle and which is axially fitted at the rear open end 38 of the body 17, the rear end being formed for instance by a portion of circular cross section of the first body portion 19, opposite to the shaving head 5.

As shown in FIGS. 2 and 4, the battery housing may further include two electrical contacts 39, 40 for connecting the battery to the switch. The electrical contact 39 may be in the form of a metallic strip which is fitted inside the end cap 37.

Besides, the end cap 37 may include for instance an upper finger rest portion 37a with protruding dots on the top surface of the handle, and a lower flattened portion 41 also with protruding dots. Both upper finger rest portion 37a and lower flattened portion 41 may be formed for instance out of elastomer or include an elastomeric trim.

Figure 1B:
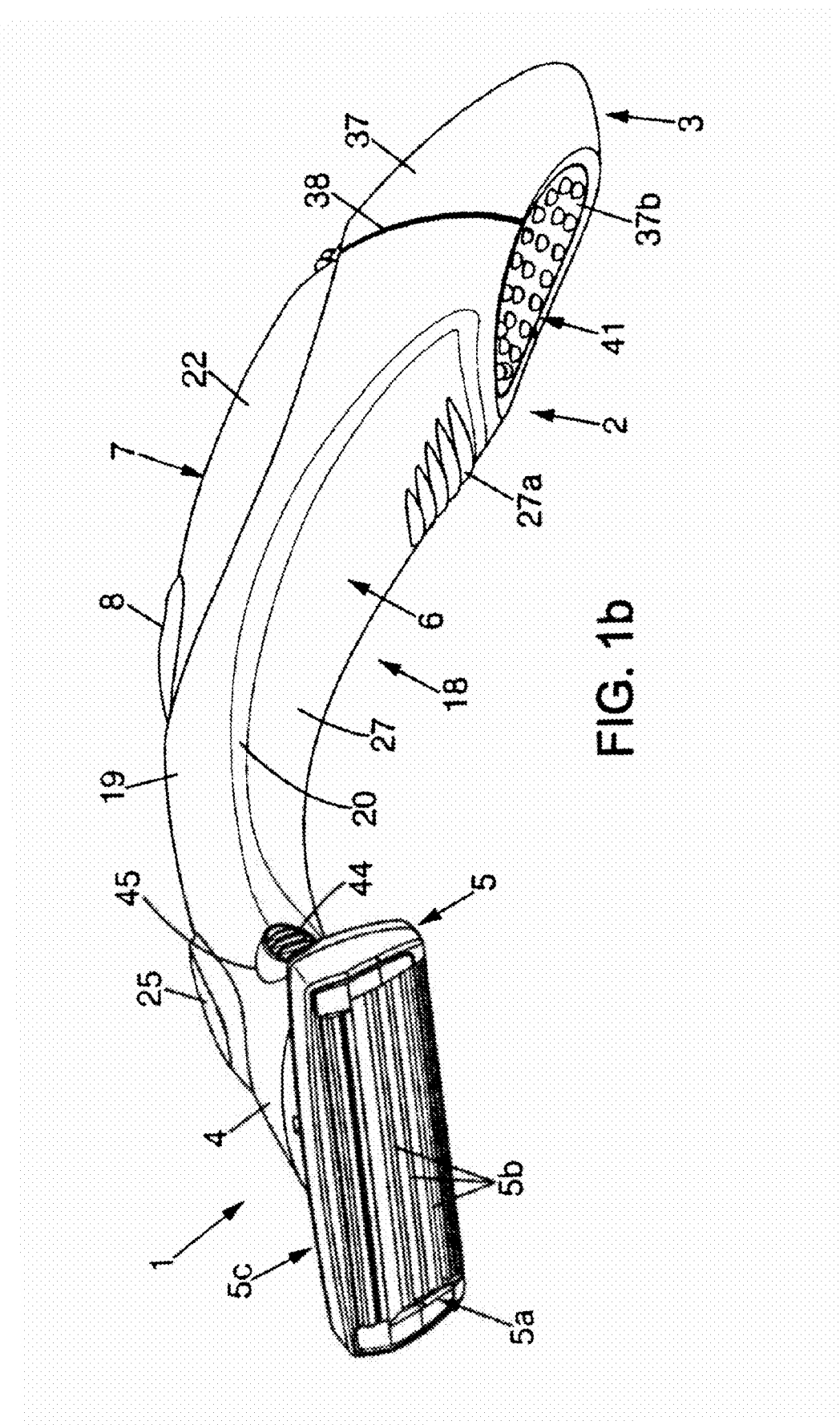

As discussed previously, the distal portion 4 of the razor handle bears the shaving head 5. As shown in FIGS. 1a and 1b, the shaving head 5 includes a front face 5a having one or several blades 5b exposed thereon, and a rear face 5c which is connected to the handle 2.

Figure 10:
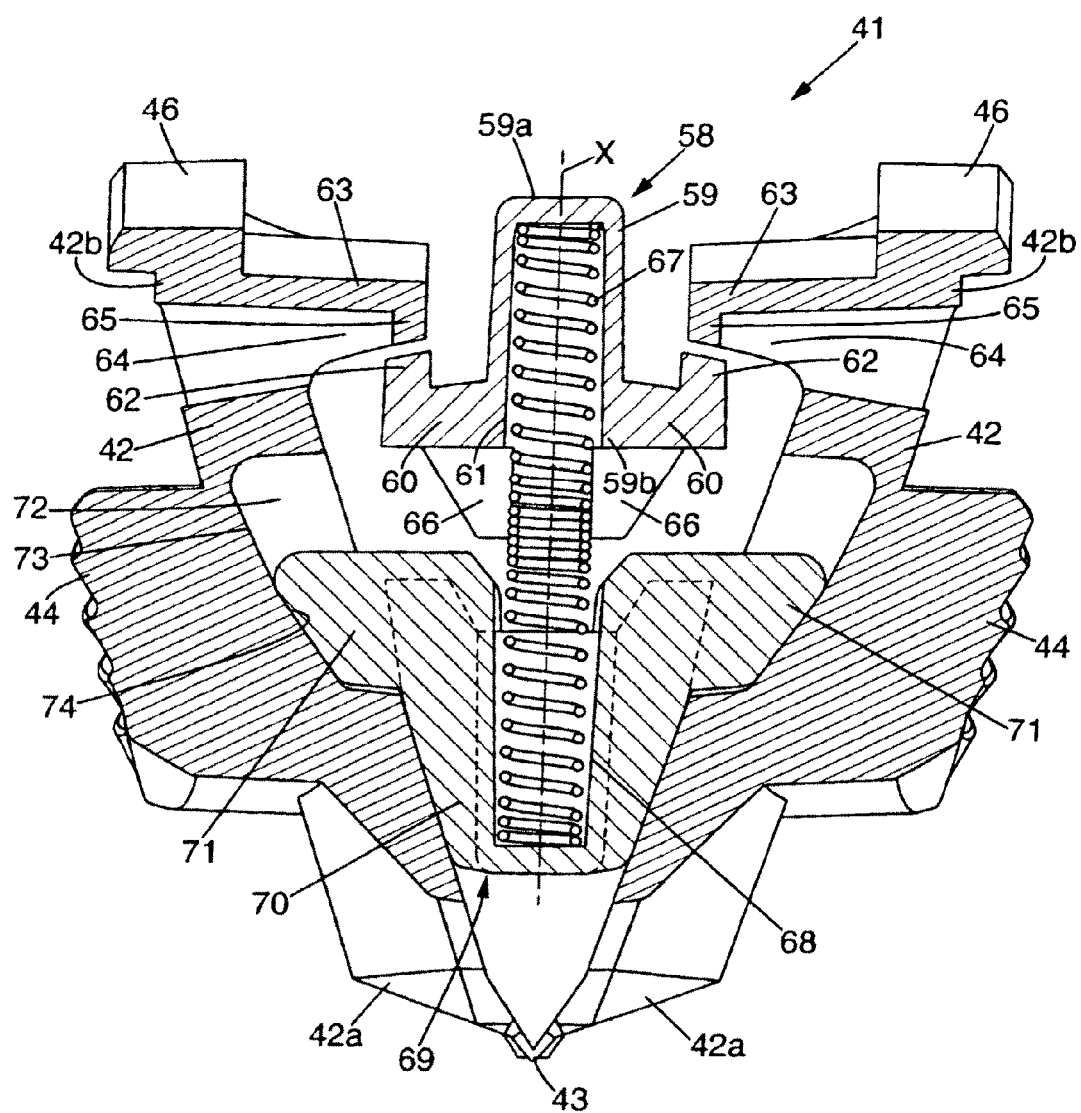

In the example shown in the drawings, the rear face 3 5 5c of the shaving head is connected to the handle 2 by a lock/release mechanism 41 which is shown in greater details in FIGS. 8a, 8b and 10 and which enables to selectively:
    either connect the shaving head 5 to the handle,
    or release the shaving head in order to exchange, shaving heads.
    It should be noted that:
    the vibrating mechanism described previously could be used with another "type of connection between the shaving head and the handle,
    and that the lock/release mechanism 41, which will now be described in greater details, could be used without any vibrating mechanism, or with a different vibrating mechanism.

As shown in greater details in FIGS. 2, 8a, 8b and 10, the lock/release mechanism 41 includes two arms 42 which can be made for instance out of molded plastic material. The two arms 42 may each extend from a first end 42a situated inside the handle body 17 toward a second end 42b which may protrude toward the outside at the distal portion 4 of the handle 2. The two arms may be disposed in a V shape, diverging from a medial axis X from their first end 42a toward their second end 42b. The medial axis X is substantially parallel to the curved longitudinal axis L of the handle.

The first ends 42a of the two arms 42 may be connected together by a hinge 43, formed for instance as a thin bridge of plastic material connecting the two arms 42 to each other when the arms are molded as a single piece. The hinge 43 may have a negligible resilient action, or no resilient action, on the two arms 42.

The two arms 42 further include respectively two push buttons 44 which may be formed integrally therewith and which may protrude laterally out of the handle body 17, for instance through two holes 45 formed in the handle body (see FIGS. 1a, 1b and 2). The pushbuttons 44 may thus be surrounded by the handle body in all directions around the holes 45.

Returning to FIGS. 2, 8a, 8b and 10, the second ends 42b of the arms 42 may include respectively two bearings, in particular two shell bearings 46 which are exposed toward the outside. Each shell bearing 46 may for instance include a cylindrical concave front face 46a and a outer end 46b which protrudes outwardly and which has also a cylindrical shape. The two front faces 46a and the two outer ends 46b have the same cylindrical axis, corresponding to the axis of rotation of the shaving head 5.

Figure 9:
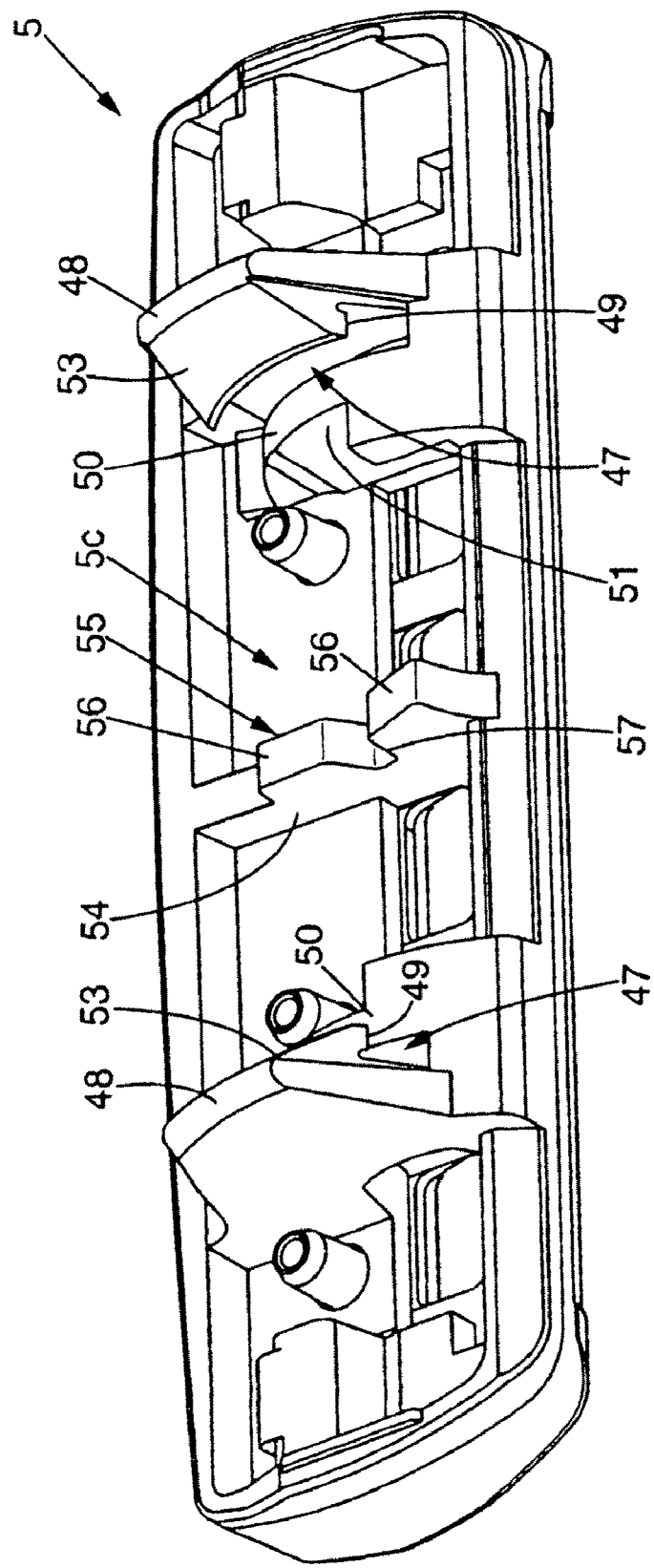
FIG. 9 is a rear view of the shaving head in the shaver of FIGS. 1a and 1b, and FIGS. 10 and 11 are cross sections of the lock/release mechanism of FIGS. 8a and 8b, respectively in the head locking position and in the head release position.

As shown in FIG. 9, the rear face 5c of the shaving head may include two inwardly facing arcuate slots 47 shaped in correspondence with the outer ends 46b of the shell bearings and adapted to receive the lateral edges for pivotally mounting the shaving head 5 onto the handle 2. These arcuate slots 47 may be formed respectively in two protruding ribs 48 and may be limited:
    toward the handle, by a first arcuate concave surface 49 facing toward the shaving head 5,
    and away from the handle, by a larger second arcuate convex surface 50 facing toward the handle 2.

The front faces 46a of the shell bearings 46 bear respectively on the arcuate convex surfaces 50. The arcuate convex surfaces 50 may include respectively two notches 51 for receiving corresponding protrusions 52 extending from inner end 46c of front face 46a of the shell bearings 46 (see FIGS. 8a and 8b), so as to limit the angular range of rotation of the shaving head 5. The razor handle 2 having a handle body 17 including two arms 42, extending from a first common end 42a situated inside the handle body toward a second end 42b which protrudes toward an outside of the handle body 17, the two arms 42 being disposed in a substantial V shape, diverging from a medial axis X from the first common end 42a toward the second end 42b, each of the two arms 42 having a bearing 46 for pivotally connecting a shaving head about an axis of rotation perendicular to the medial axis X the arms 42 extending substantially symmetrically on both sides of the medial axis X, each bearing 46 having an inner end 46c and an outer end 46b, wherein the inner 46c and outer end 46c extend parallel to the medial axis X with the inner end 46c located between the medial axis X and the outer end 46b, each bearing 46 further comprising a protrusion 52 which extends perpendicularly from the inner end 46c and away from the first common end 42a so as to limit an angular range of rotation of the shaving head, the razor handle further including a plunger 58 movably mounted, substantially along the medial axis X between the two arms 42.

Besides, as shown in FIG. 9, the ribs 48 may include two inclined surfaces 53 facing each other and extending slantwise toward each other from the top of the ribs 48 toward the arcuate slots 47, so as to facilitate the insertion of the shell bearings 46 in the arcuate slots 47.

The rear face 5c of the shaving head 5 may further include a central rib 54 having an edge forming a top cam surface 55 facing away from the shaving head 5 toward the handle 2. The cam surface 55 may have a generally V shape, and may for instance include two substantially flat surfaces 56 which are slightly inclined relative to one another and which may be for instance separated from one another by a notch 57 hollowed out in the rib 54 in order (e.g. to adapt the shaving head 5 on a other type of handle having a flexible tongue which is inserted into the notch 57).

Returning to FIGS. 2, 8a, 8b and 10, the lock/release mechanism 41 includes a plunger 58 which is movably mounted, substantially along the medial axis X between the two arms 42. This plunger 58 has a central body 59 and two lateral wings 60 extending opposite to one another toward the two arms 42. The central body 59 extends longitudinally parallel to the medial axis X, between a first, substantially flat free end 59a which bears against the cam surface 55 of the shaving head, and a second end 59b facing away from the shaving head 5. A recess 61 may be hollowed out in the central body 59, the recess forming a blind hole which opens at the second end 59b of the central body 59, in the direction of the handle 2.

Each lateral wing 60 may include a detent 62 protruding parallel to the medial axis X toward the shaving head 5, the detent facing an inwardly extending protrusion 63 belonging to the corresponding arm 42. The protrusion 63 has an opening 64 which is limited inwardly by a rim 65 belonging to the protrusion. Besides, the lateral wings 60 of the plunger 58 may each have respectively two ribs 66 which extend in a medial plane of the arms 42, opposite to the central body 59.

The plunger 58 is elastically biased toward the cam surface 55 of the shaving head so as to cooperate therewith by camming action to bias the shaving head in rotation toward a rest position. In the example shown in the drawings, the plunger 58 is elastically biased by a spring 67, for instance a helicoidal spring, which has a first 5 spring end fitted into the recess 61. The spring 67 also has a second spring end fitted into a recess 68, for instance in the form of a blind hole, hollowed out in an arm pusher 69.

The arm pusher is disposed between the arms 42 in 10 line with the plunger 58 along the medial axis X. The arm pusher 69 is disposed between the plunger 58 and the hinge 43 along the medial axis X. The recess 68 opens parallel to the medial axis X toward the plunger 58.

Besides, in the example shown in the drawings, the spring coils of the helicoidal spring 67 may be in mutual contact in a central portion of the spring 67, between the recesses 61, 68, and may be separate from each other between this central portion of the spring, except for the last spring coils at both ends of the spring.

The arm pusher is slidably mounted between the arms 42, substantially parallel to the medial axis X and is elastically biased by the spring 67 toward the handle, i.e. away from the shaving head 5. The arm pusher 69 cooperates by camming action with the two arms 42 for biasing the arms outwardly away from each other, toward a head locking position shown in FIGS. 8a, 8b and 10, where outer ends 46b of the shell bearings 46 penetrate in the corresponding arcuate slots 47 of the shaving head.

The arm pusher 69 may have a central body 70 in which the recess 68 is hollowed out, and two lateral extensions 71 extending opposite to one another toward the two arms 42 and cooperating by camming action respectively with the two arms for biasing the arms toward the head locking position.

More particularly, the lateral extensions 71 may penetrate in two slots 72 formed respectively in the two arms and facing each other. The two lateral extensions 71 of the arm pusher may have lateral edges 74 which cooperate by camming action with the respective bottoms 73 of the slots. The lateral edges may be diverging from the medial axis X in a direction away from the handle 2, whereas the bottoms 73 may also diverge from the medial axis in the direction away from the handle.

Thanks to these dispositions, the same spring 67 is used to bias the plunger 58 elastically toward the cam surface 55 of the shaving head and to bias the arm pusher 69 away from the shaving head, thus biasing both the shaving head in rotation toward the rest position and the arms 42 toward the head lock position.

It should be noted that, in the position of FIGS. 8a, 8b, and 10, the plunger 58 is maintained between the two arms 42 both by cooperation with the spring 67, by abutment against the cam surface 55 of the shaving head, and eventually by abutment against the protrusions 63 of the arms 42.

When a shaving head 5 is mounted on the handle 2, the lock/release mechanism 41 is normally in the head lock position. Starting from this position, when a user wishes to exchange shaving heads, he first pushes on both pushbuttons 44, which rotates the arm 42 toward each other against the camming action of the arm pusher 69. During this movement, the arm pusher 69 slides along the medial axis X toward the plunger 58, and the arm pusher partially penetrates between the ribs 66 of the plunger. When the 30 arms 42 have sufficiently rotated toward each other to reach the head release position shown in FIG. 11, the head is released by the shell bearings 46 and is simultaneously ejected by the plunger 58.

Figure 11:
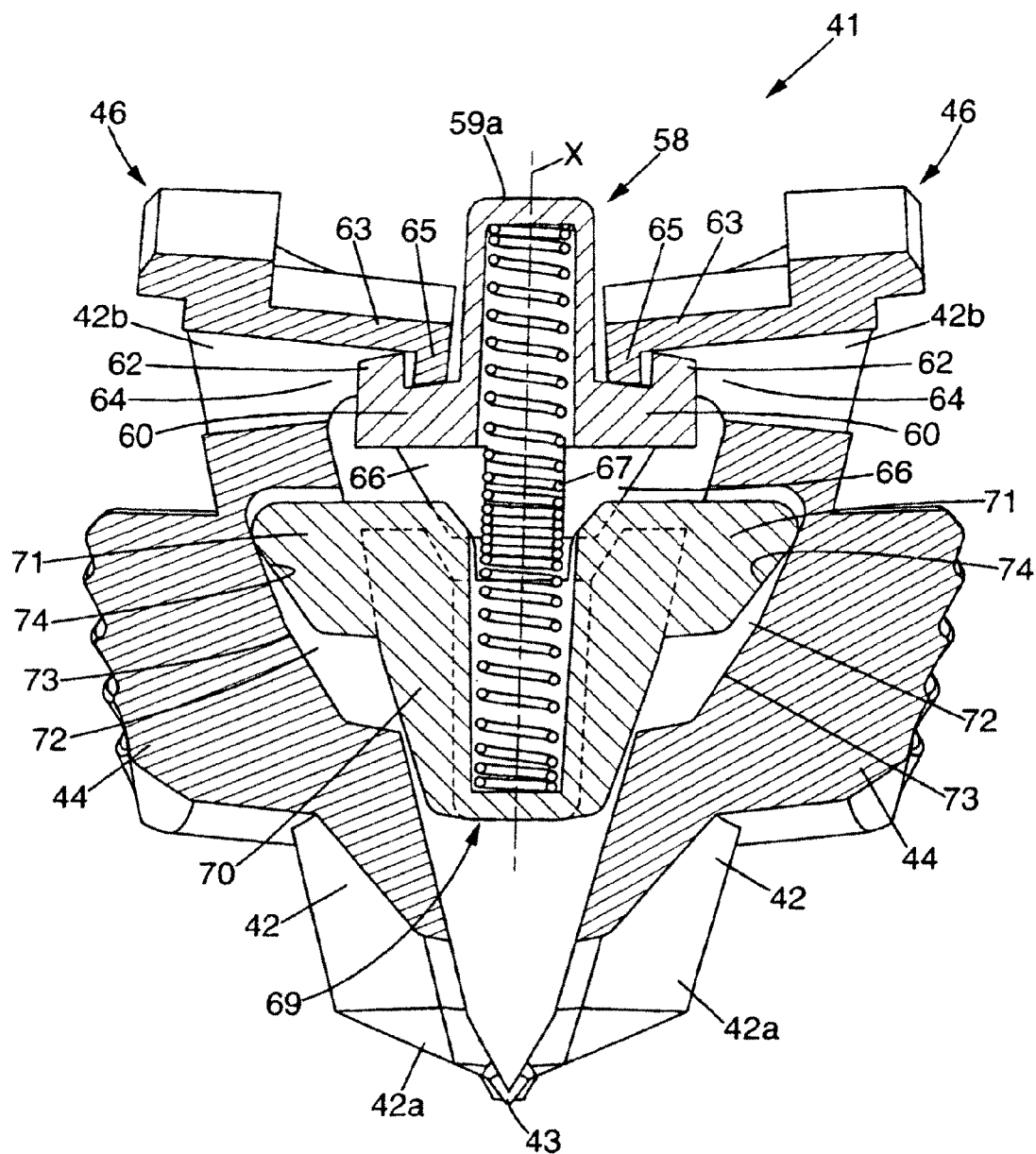

The plunger 58 then moves forward to an outwardly protruding position, so that the detents 62 of the plunger penetrate in the recesses 64 of the extensions 63 of the arms. In this position, as shown in FIG. 11, the arms 42 are maintained in the head release position by abutment of the rims 65 against the detents 62, thus cooperating by hooking action. Afterwards, when a new shaving head 5 is fixed to the handle 2, the shell bearings 46 are inserted between the arcuate slots 47 of the new shaving head 5 and the cam surface 55 of the new shaving head pushes the plunger 58 backward toward the handle. The arms 42 are then released and rotate away from each other under the action of the arm pusher 69, so that the shell bearings 46 insert themselves in the arcuate slots 47 of the new shaving head, and the lock/release mechanism 41 is again in the position shown in FIGS. 8a, 8b and 10.

The invention claimed is:

1. A razor having a shaving head and a razor handle having a handle body including:

two arms, extending from a first common end situated inside the handle body toward a second end which protrudes toward the outside of the handle body, the two arms being disposed in a substantial V shape, diverging from a medial axis from the first common end toward the second end, each of the two arms having a bearing for pivotally connecting the shaving head about an axis of rotation perpendicular to the medial axis, the arms extending substantially symmetrically on both sides of a the medial axis, each bearing having an inner ends and an outer ends, wherein the inner and outer end extend parallel to the medial axis with the inner end located between the medial axis and the outer end, each bearing further comprising a protrusion which extends perpendicularly from the inner end and away from the first common end so as to limit an angular range of rotation of the shaving head, the razor handle further including a plunger movably mounted, substantially along the medial axis between the two arms.

2. A razor handle having a handle body including:

two arms, extending from a first common end situated inside the handle body toward a second end which protrudes toward an outside of the handle body, the two arms being disposed in a substantial V shape, diverging from a medial axis from the first common end toward the second end, each of the two arms having a bearing for pivotally connecting a shaving head about an axis of rotation perpendicular to the medial axis, the arms extending substantially symmetrically on both sides of the medial axis, each bearing having an inner end and an outer end, wherein the inner and outer ends extend parallel to the medial axis with the inner end located between the medial axis and the outer end, each bearing further comprising a protrusion which extends perpendicularly from the inner end and away from the first common end so as to limit an angular range of rotation of the shaving head, the razor handle further including a plunger movably mounted, substantially along the medial axis between the two arms.

3. A razor handle having a handle body including:

two arms, extending from a first common end situated inside the handle body toward a second end which protrudes toward the outside of the handle body, the two arms being disposed in a substantial V shape, diverging from a medial axis from the first common end toward the second end, each of the two arms having a bearing for pivotally connecting a shaving head about an axis of rotation perpendicular to the medial axis, the arms extending substantially symmetrically on both sides of the medial axis, each bearing having an inner end and an outer end, wherein the inner and outer end extend parallel to the medial axis with the inner end located between the medial axis and the outer end, each bearing further comprising a protrusion which extends perpendicularly from the inner end and away from the first common end so as to limit an angular range of rotation of the shaving head, the razor handle further including a plunger movably mounted, substantially along the medial axis between the two arms, and a lock/release mechanism including the two arms.

4. The razor handle according to claim 3, wherein the two arms further include two push buttons which are formed integrally therein and which protrude laterally out of the handle body.

* * * * *